United States Patent [19]
Thorne

[11] Patent Number: 6,034,156
[45] Date of Patent: Mar. 7, 2000

[54] DISPERSION

[75] Inventor: Philip Edward Thorne, Dartford, United Kingdom

[73] Assignee: Coates Brothers PLC, Kent, United Kingdom

[21] Appl. No.: 08/976,673

[22] Filed: Nov. 24, 1997

Related U.S. Application Data

[63] Continuation of application No. 08/513,970, filed as application No. PCT/GB94/00465, Mar. 10, 1994, abandoned.

[30] Foreign Application Priority Data

Mar. 10, 1993 [GB] United Kingdom .................. 9304912

[51] Int. Cl.$^7$ ...................................... C08J 3/205
[52] U.S. Cl. ...................... 523/339; 523/334; 523/340; 523/342; 528/326; 528/501; 528/502 R
[58] Field of Search ................................ 523/334, 339, 523/340, 342; 528/501, 502 R, 326

[56] References Cited

U.S. PATENT DOCUMENTS

| | | | |
|---|---|---|---|
| 3,575,382 | 4/1971 | Loomans | 366/301 |
| 3,929,707 | 12/1975 | Berg et al. | 523/340 |
| 4,279,802 | 7/1981 | Laely et al. | 525/444 |
| 4,430,461 | 2/1984 | Deering et al. | 523/340 |
| 4,732,968 | 3/1988 | Obayashi et al. | 528/501 |
| 4,759,801 | 7/1988 | Goldmann et al. | 524/88 |

FOREIGN PATENT DOCUMENTS

| | | | |
|---|---|---|---|
| 0922438 | 3/1973 | Canada | 523/339 |
| 1080780 | 8/1967 | United Kingdom . | |
| 1467930 | 3/1977 | United Kingdom . | |

*Primary Examiner*—Andrew E. C. Merriam
*Attorney, Agent, or Firm*—Blank Rome Comisky & McCauley LLP

[57] ABSTRACT

The presently claimed process for the production of a solid pigment/resin dispersion comprises the steps of mixing together a particulate pigment, a solid resin carrier, a water-immiscible organic solvent in which the carrier is at least partially soluble, water, and, optionally, a water miscible solvent until the mixture separates into an aqueous phase and a coherent phase comprising resin, pigment and organic solvent; separating water from the coherent phase; and continuing to mix the coherent phase while removing the organic solvent under the action of heat and/or reduced pressure until a dry particulate material comprising a pigment and resin is formed.

18 Claims, No Drawings

DISPERSION

This is a continuation of application Ser. No. 08/513,970, filed on Nov. 8, 1995, now abandoned, which is filed as a 371 of PCT/GB94/00465, filed on Mar. 10, 1994, which claims priority of United Kingdom Application No. 9304912.0 filed Mar. 10, 1993.

This invention is concerned with improvements in and relating to the manufacture of pigment/resin dispersions for use, for example, in the production of surface coating compositions.

Surface coating compositions, such as printing inks and paints, commonly comprise three constituents, namely one or more resins or polymers together with a liquid diluent or solvent, and, as colourant, a pigment. The pigment is generally insoluble in any of the other constituents of the coating composition and the dispersion of the pigment in the resinous vehicle is a principal task in the manufacture of such compositions. It is known to provide pigment/resin dispersions which may be mixed with further or other resins and appropriate liquid vehicles to form the desired coating composition.

It is an object of this invention to provide an improved method for the manufacture of solid, particulate pigment/resin dispersions.

According to the invention there is provided a method for the production of a solid particulate pigment/resin dispersion which comprises the steps of:

(i) mixing together:

(a) a solid resin carrier;

(b) a water-immiscible volatile organic liquid which is a solvent or partial solvent for the resin;

(c) a particulate pigment;

(d) water; and, optionally, (e) a water-miscible solvent;

until the mixture separates into an aqueous phase comprising largely water and a coherent phase comprising resin, organic solvent and pigment;

(ii) separating the water from the coherent phase; and (iii) continuing to mix the coherent phase whilst removing organic solvent therefrom under the action of heat and/or reduced pressure, until a dry particulate material comprising pigment and resin is formed.

The method of the invention is preferably carried in a single apparatus having means for mixing the contents of the apparatus, means for withdrawing the aqueous phase in step (ii) of the method, and means for reducing the pressure and/or heating the interior of the apparatus. Conveniently, the apparatus takes the form of a generally horizontally arranged drum with appropriate mixing means located on a horizontal rotatable shaft mounted in the drum. A particularly preferred form of mixing apparatus is that described in EP-A-0451747 and EP-A-0422454. Such apparatus is sold under the trade name Discotherm by List A. G. of Arisdorf, Switzerland.

EP 422 456 discloses a mixing kneader for the mechanical and/or thermal treatment of products in a liquid, paste and/or powdered state.

In a mixing kneader of that type, a stationary opposing kneading element consists essentially of a hook which cleans both the disk segments and the shaft. The arm cleaning the shaft, in particular, is directed against the direction of rotation of the shaft.

EP 422 454 also discloses that conventionally, a kneading element can consist of a leg close to the internal casing wall, a portion close to the disc segment and an arm close to the shaft. The leg is inclined against the direction of rotation of the shaft while the portion extends in the direction of rotation as a secant to the shaft. The shaft-side arm extending in parallel is connected thereto.

The specific kind of kneader to which EP 422 454 relates comprises a casing and a shaft which rotates round an axis of rotation in the casing. Axially distributed radial disk segments are provided on the shaft. Stationary opposing kneading elements which clean the disc segments and shaft consist in each case of a leg, a portion extending close to the disk segments and an arm extending close to the external surface of the shaft. The disc segments are located in the kneading chambers between the disc segments, wherein the legs extend from a support on an internal casing wall to the portion. The portion and its center line extends close to the disk segments in the direction of rotation of the shaft at an inclination to the shaft in the manner of a secant up to a tangent. The arm and its center line extend in the direction of rotation parallel to the external surface of the shaft.

EP 451 747 also relates to a continuously operating mixing kneader for the thermal treatment of products in the liquid, pasty and/or powdered state. It comprises a housing, wherein a kneader shaft is equipped with disk elements and kneading bars and rotates round an axis of rotation. The shaft is arranged so as to extend axially and concentrically in this housing, the kneader shaft transporting the product in the transporting direction, and wherein kneading counter-elements are provided stationarily on the housing between the disk elements. Moreover, the disk elements are arranged in disk planes perpendicularly to the kneader shaft and form between themselves free sectors which form kneading chambers with the disk plane of adjacent disk elements.

A generally horizontal mixing kneader of this kind normally operates with average product filling levels of between 50% and 80%. This makes it possible to supply or remove gases or vapors during the process.

In the specification arrangement disclosed in EP 451 747, the kneading bars are arranged on a negative offset line. A pair of disk elements with a kneading bar are followed in the direction of transport and counter to the direction of rotation by a pair of disk elements without a kneading bar. In this region both the transport of the product is restrained and the kneading action is reduced, since the kneading is performed here only by the disk elements, possibly interacting with the kneading counter-elements.

In the case of a positive offset line, a pair of disks with kneading bar is followed, seen in the direction of transport and counter to the direction of rotation, by a further pair of disk elements likewise with a kneading bar. The product is passed on, as it were, from the one kneading bar to the other kneading bar, having the effect both of speeding up the transport and of considerably improving the kneading action.

In this apparatus the contents in a horizontal housing are kneaded and/or mixed by elements mounted on a central rotatable shaft and consisting of radial disc segments terminating in transverse bars close to the housing wall. As the shaft rotates, segments and shaft are freed of adherent material by cranked elements (hooks) attached to the housing wall. From a radial terminal stub integral with the housing wall, the crank element bends into a section parallel to the transverse bar, then a generally radial section, and finally an arm parallel to the shaft surface.

In the following description, where appropriate, reference to the apparatus used is to apparatus of the particular type described above but, of course, other mixing and/or kneading apparatus may be employed in accordance with the invention.

The method of the invention is carried out using four basic ingredients, namely resin, water-immiscible organic solvent, pigment and water. The resin may be any of a wide variety of film-forming resins of polymeric materials such as are used in the manufacture of surface coating compositions. A wide variety of these are available and a general discussion of film-forming polymeric materials, for use in surface coating compositions, is to be found in the book "The Chemistry Of Organic Film Formers", D. H. Solomon, Robert E. Krieger publishing company, 2nd Edition, 1982. (See especially Chapters 2, 3, and 6 thereof).

Resins or polymers particularly suitable for use in the manufacture of the inks are described, for example, in the Printing Ink Manual, 4th Edition, Van Nostrand Reinhold (International), 1988, see especially Chapter 4, Section IV. Particular examples of resins which may be especially noted include cellulose acetate propionate (CAP) and nitrocellulose. It should be noted that we have found that the method of the invention may not be appropriate to all film-forming resins. Thus, for example, we have found that polyvinyl butyral resins do not always give a satisfactory particular final product. However it is a matter for simple test to establish whether any particular resins/pigments/solvent combinations can be processed in accordance with the invention.

The organic solvent should be volatile, that is it should be capable of being removed under the action of heat and/or reduced pressure. A variety of solvents may be employed and these include esters such as n-propyl acetate and butyl acetate, and ketones such as are commonly used in the surface coatings industry.

The pigment employed may be any of wide variety of pigments as used to colour surface coating compositions. Suitable pigments are, for example discussed, in the Printing Ink Manual, referred to above, at Chapter 4, Section I.

The final component of the initial mixture, water, needs no special comment save to say that water separated during the course of the method of the invention, in step (ii), may be re-used or recycled for use in this first step, if necessary with the addition of make-up water.

The relative proportions of the various components of the initial mixture may vary within wide limits. An important factor will be the weight ratio of resin to pigment, since this will determine the composition of the final particulate product, and this ratio is suitably from 0.8 to 0.33, especially 0.6 to 0.33, parts by weight of resin per part by weight of pigment. The amount of organic solvent employed is conveniently calculated on the basis of the resin employed and, thus, the weight ratio of solvent to resin is suitably from 0.9:1 to 2.2:1, especially 1.1:1 to 1.7:1. Finally, the amount of water incorporated in the starting mixture is suitably from 0.75 to 1.5, especially about one part by weight per part by weight of pigment.

An optional ingredient which is usefully present in the starting mixture is a volatile water-miscible organic solvent which may, or may not, be solvent for the resin. Examples of suitable water-miscible solvents include alcohols such as isopropyl alcohol, n-propyl alcohol and n-butyl alcohol. The water-miscible solvent which, inter alia, is believed to assist in wetting of the pigment in the initial stages of mixing, is suitably present in an amount of from 0.3 to 1.0 parts by weight, preferably 0.5 to 0.8 parts by weight, based on the weight of resin and may replace a part of the water-immiscible solvent.

In the initial stage of the method of the invention, the various ingredients are charged to the mixing apparatus. The ingredients may be added in any order. The water and/or organic solvent will, of course, be added in liquid form. The resin is conveniently added in particulate form. The pigment will usually should be in particulate or powdered form but it may also be in presscake form.

Once all the components have been added to the mixing apparatus, the apparatus is closed and mixing is started. During the course of this initial mixing, it is believed that the water serves as a vehicle for assisting mixing, grinding and general contact between the components of the mixture. As mixing progresses, the contents of the apparatus become heterogeneous, separating into a generally coherent mass comprising resin, pigment and organic solvent and, as a separate phase, water. Once most of the water (e.g. 70% or more thereof) has separated out, it is removed from the mixing vessel, during the course of which removal mixing may be continued or not, as desired. The total period required from starting mixing to removal of the separated water will, of course, vary depending upon the nature of the components of the starting mixture, their relative proportions, the degree or intensity of mixing, etc. However, generally a period of 5 to 60 minutes, especially 10 to 20 minutes, will prove sufficient.

The separated water having been removed from the mixing apparatus, mixing is continued under conditions favouring removal of volatile organic solvent from the mixture in the mixer. Typically, reduced pressures of 0.05 to 0.5 bar, especially 0.1 to 0.3 bar, and temperatures of 50 to 100° C., especially 55 to 85° C., have been found suitable for the operation of this stage of the method. As the mixture is mixed whilst the organic solvent is removed the mass becomes increasingly stiff or viscous until, generally quite swiftly, it starts to break down into dry particulate form. The periods of time required from the start of mixing with removal of volatile organic solvent to the formation of the final dry particulate product will vary widely, however a period of say, 1 to 10 hours (depending on the product and machine capacity) will generally be appropriate. The final product comprises the pigment dispersed in the resin (or coated with an intimate coating of the resin) together with small amounts (e.g. up to 2.5% by weight) of water and organic solvents. The final product is obtained in particulate form, generally having a particle size of 0.3 to 10 mm.

The volatile organic solvent removed from the mixed mass in the mixture is, most conveniently, condensed and recycled or reused, e.g. may be returned or reused as the organic solvent component of the starting mixture, or a part of that component.

The particulate final product obtained in accordance with the invention is a dry material which may be stored and/or transported without final treatment other than being put into appropriate containers. The product may then be used in the manufacture of coating compositions, such as printing inks or paints, to supply all of the pigment and all or part of the resin vehicle of the coating composition. Generally, the coating composition will be made up by simply stirring the product of the present invention, optionally with further resin, and an appropriate liquid vehicle, optionally with suitable additives, to form the desired composition.

In order that the invention may be well understood, the following Examples are given by way of illustration only.

The following examples were carried out using a Discotherm DTB3 Batch machine supplied by List AG of Arisdorf, Switzerland.

EXAMPLE 1

1800 gm of a CI 15.4 (phthalocyanine blue) pigment was taken and charged to the mixer with 1660 gm water followed by a solution of low viscosity, low nitration grade nitrocellulose (30% damped with isopropanol), dissolved in 250 gm iso-propanol and 550 gm butyl acetate.

These were mixed at about 30 rpm, initially to form a homogeneous mass. After 5 minutes mixing this separated into a smooth, firm dough and an aqueous phase.

After a further 10 minutes mixing the machine was stopped and the aqueous phase drained off. Mixing was then continued with the application of heat (80° C.) and vacuum (150 mbar) to remove the remaining volatile components. These were condensed and collected for reuse.

After a further 15 minutes the mix was seen to crumble into granules. Following this, the shaft speed was reduced to 8 rpm and the application of heat and vacuum continued until a product of 98% non-volatile content was obtained. This was mainly in the form of fine granules and powder.

The product was dissolved into a nitrocellulose flexographic ink medium to give an ink displaying excellent gloss, colour strength and transparency when printed.

EXAMPLE 2

The same procedure as for Example 1 was followed except that the charge was: 1660 gm. CI 15.4 pigment; 1800 gm water; 1110 gm nitrocellulose; 250 gm iso-propanol; 550 gm iso-propyl acetate.

In this case a pressure of 300 mBar was maintained until the mix had crumbled to prevent too fast a granulation giving less energy input. Thereafter the pressure was reduced to expedite drying.

A similar product was obtained to that obtained in Example 1 and which gave comparable results when converted to a flexographic ink.

EXAMPLE 3

1660 gm of CI 53.1 Lake Red C) pigment was charged to the mixer with 1740 gm water; 838 gm "alcohol soluble" cellulose acetate proprionate; 460 gm iso-propanol; 715 gm butyl acetate.

These were mixed at 35 rpm to give a homogeneous paste which separated as in Example 1after 5minutes. Mixing was continued for a further 15 minutes and then the machine was stopped and the aqueous phase removed.

Mixing was continued under heat (75 deg. C.) and vacuum (200 mBar gauge) for 20 minutes until the material had crumbled.

Mixing was continued under heat and vacuum until a dry, powdery product of 97% non-volatiles was obtained.

When the product was dissolved in a suitable gravure ink medium the subsequent ink gave excellent gloss, colour strength and transparency when printed.

I claim:

1. A method for the production of a solid particulate pigment/resin dispersion which comprises the steps of:
   (i) mixing and kneading together:
      (a) a solid film-forming resin carrier;
      (b) a water-immiscible volatile organic liquid which is a solvent or partial solvent for the resin;
      (c) a particulate pigment;
      (d) water; and optionally,
      (e) a water-miscible solvent;
   until the mixture separates into an aqueous phase comprising largely water and a coherent mass comprising resin, organic solvent and pigment;
   (ii) separating the aqueous phase from the coherent mass; and
   (iii) continuing to mix and knead the coherent mass whilst removing organic solvent therefrom under the action of heat at a temperature of from about 55° C. to 75° C. until the coherent mass breaks down to form a dry particulate material comprising said pigment resin dispersion.

2. The method as claimed in claim 1, in which the process is carried in a single apparatus having means for mixing and kneading the contents of the apparatus, means for withdrawing the aqueous phase separated in step (ii) of the method, and means for reducing the pressure and/or heating the interior of the apparatus in step (iii) of the method.

3. The method as claimed in claim 2, in which said apparatus is in the form of a generally horizontal arranged drum with appropriate mixing means located on a horizontal rotatable shaft mounted in said drum.

4. The method as claimed in claim 1, in which the solid resin carrier (a) and the particulate: pigment (c) in step (i) are in a resin:pigment weight ratio (a):(c) of from 0.8:1 to 0.33:1.

5. The method as claimed in claim 1, in which the water-immiscible volatile organic liquid solvent (b) plus any water-miscible solvent (e) and the solid resin carrier (a) in step (I) are in a solvent:resin weight ratio ((b)+(e)):(a) of from 0.9:1 to 2.2:1.

6. The method as claimed in claim 1, in which the water (d) and the particulate pigment (c) in step I) are in a water:pigment ratio (d):(c) of from 0.75:1 to 1.5:1.

7. A method of preparing a printing ink composition, which method comprises the steps of
   (A) producing a solid particulate pigment/resin dispersion by:
      (i) mixing and kneading together:
         (a) a solid film-forming resin carrier;
         (b) a water-immiscible volatile organic liquid which is a solvent or partial solvent for the resin;
         (c) a particulate pigment;
         (d) water; and optionally,
         (e) a water-miscible solvent;
      until the mixture separates into an aqueous phase comprising largely water and a coherent mass comprising resin, organic solvent and pigment;
      (ii) separating the aqueous phase from the coherent mass; and
      (iii) continuing to mix and knead the coherent mass whilst removing organic solvent therefrom under the action of heat at a temperature of from 55° C. to 75° C. until the coherent mass breaks down to form a dry particulate material comprising the said pigment resin dispersion; and
   (B) admixing the said pigment resin dispersion with a liquid vehicle, optionally with further resin and optionally with suitable additives, to form printing ink.

8. The method as claimed in claim 7, in which the process is carried in a single apparatus having means for mixing and kneading the contents of the apparatus, means for withdrawing the aqueous phase separated in step (A)(ii) of the method, and means for reducing the pressure and/or heating the interior of the apparatus in step (A)(iii) of the method.

9. The method as claimed in claim 8, in which the apparatus is in the form of a generally horizontally arranged drum with appropriate mixing means located on a horizontal rotatable shaft mounted in the drum.

10. The method as claimed in claim 7, in which the solid resin carrier (a) and the particulate pigment (c) in step (A)(i) are in a resin: pigment weight ratio (a):(c) of from 0.8:1 to 0.33:1.

11. The method as claimed in claim 7, in which the water-immiscible volatile organic liquid solvent (b) plus any water-miscible solvent (e) and the solid resin carrier (a) in step (A)(i) are in a solvent: resin weight ratio ((b)+(e)):(a) of from 0.9:1 to 2.2:1.

12. The method as claimed in claim 7, in which the water (d) and the particulate pigment (c) in step (A)(i) are in a water: pigment weight ratio (d):(c) of from 0.75:1 to 1.5:1.

13. The method of claim 1, wherein during step (iii), the mixing and kneading is also performed at reduced pressure.

14. The method of claim 7, wherein during step (iii), the mixing and kneading is also performed at reduced pressure.

15. The method of claim 1, wherein the aqueous phase is decanted from the coherent mass.

16. A method for the production of a solid particulate pigment/resin dispersion which comprises the steps of:
   (i) mixing and kneading together:
      (a) a solid film-forming resin carrier;
      (b) a water-immiscible volatile organic liquid which is a solvent or partial solvent for the resin;
      (c) a particulate pigment;
      (d) water; and optionally,
      (e) a water-miscible solvent;
   until the mixture separates into an aqueous phase comprising largely water and a coherent mass comprising resin, organic solvent and pigment;
   (ii) decanting the aqueous phase from the coherent mass; and
   (iii) continuing to mix and knead the coherent mass whilst removing organic solvent therefrom under the action of heat at a temperature of from 55° C. to 85° C. until the coherent mass breaks down to form a dry particulate material comprising the said pigment resin dispersion.

17. The method of claim 16, wherein the temperature is below about 80° C.

18. The method of claim 16; wherein the temperature is below about 75° C.

* * * * *